United States Patent
Gendou et al.

(10) Patent No.: US 7,832,615 B2
(45) Date of Patent: *Nov. 16, 2010

(54) JOINING METHOD AND JOINING APPARATUS

(75) Inventors: Toshiyuki Gendou, Hiroshima (JP); Katsuya Nishiguchi, Hiroshima (JP)

(73) Assignee: Mazda Motor Corporation (JP)

( * ) Notice: Subject to any disclaimer, the term of this patent is extended or adjusted under 35 U.S.C. 154(b) by 595 days.

This patent is subject to a terminal disclaimer.

(21) Appl. No.: 11/730,428

(22) Filed: Apr. 2, 2007

(65) Prior Publication Data

US 2007/0241167 A1    Oct. 18, 2007

(30) Foreign Application Priority Data

Apr. 13, 2006    (JP) .................. 2006-111273

(51) Int. Cl.
*B23K 20/12* (2006.01)
(52) U.S. Cl. ............. 228/112.1; 228/2.1; 228/233.1
(58) Field of Classification Search ........... 228/112.1, 228/2.1, 233.1
See application file for complete search history.

(56) References Cited

U.S. PATENT DOCUMENTS

| | | | |
|---|---|---|---|
| 6,832,713 B2* | 12/2004 | Kano et al. | 228/2.1 |
| 7,066,375 B2* | 6/2006 | Bolser | 228/114 |
| 7,090,112 B2* | 8/2006 | Masingale | 228/112.1 |
| 7,225,966 B2* | 6/2007 | Christner | 228/112.1 |
| 7,353,977 B2* | 4/2008 | Nishiguchi et al. | 228/112.1 |
| 7,360,677 B2* | 4/2008 | Gendou et al. | 228/112.1 |
| 2002/0158109 A1* | 10/2002 | Gendoh et al. | 228/112.1 |
| 2004/0041006 A1 | 3/2004 | Masingale | |
| 2004/0134971 A1 | 7/2004 | Narita et al. | |
| 2005/0035180 A1 | 2/2005 | Nishiguchi et al. | |
| 2007/0039154 A1* | 2/2007 | Gendou et al. | 29/407.1 |

FOREIGN PATENT DOCUMENTS

| | | |
|---|---|---|
| EP | 1 674 188 A2 | 6/2006 |
| JP | 2004-174507 | 6/2004 |
| JP | 2006-021217 | 1/2006 |
| JP | 2006-043720 | 2/2006 |

OTHER PUBLICATIONS

European Search Report mailed Aug. 7, 2007 for Application No. 07007430.7-2302.

* cited by examiner

*Primary Examiner*—Roy King
*Assistant Examiner*—Michael Aboagye
(74) *Attorney, Agent, or Firm*—Studebaker & Brackett PC; Donald R. Studebaker (57) ABSTRACT

A metal plating applied on a joining portion of a first metal member is heated before a rotating tool under rotation being pressed against a second metal member. Herein, the rotating tool under rotation starts being pressed against the second metal member when the metal plating is heated at least up to a specified temperature that is high enough to make the metal plating in a softened solid state. Thereby, a properly-high joining strength can be provided in a frictional joining of a metal member with a metal plating thereon and another metal member.

9 Claims, 6 Drawing Sheets

JOINING METHOD AND JOINING APPARATUS

BACKGROUND OF THE INVENTION

The present invention relates to a solid-state jointing technology of different kinds of metal members.

A frictional joining method using a frictional heat has been proposed as a joining method of different kinds of metal members (Japanese Patent Laid-Open Publication No. 2006-21217, US Patent Application Publication No. 2005/0035180). Herein, the metal members to be joined, and a rotating tool is pressed against one of the metal members. By pressing of the rotating tool, the metal member is softened and made in a plastic flow state, whereby the metal members are joined in a solid state.

This frictional joining method is advantageous to joining for different kinds of metal members. Namely, it is generally difficult to uniformly melt different kinds of metal members that have different physical properties, such as melting point or thermal conductivity, in a melting-joining method like an arch welding. Also, a fragile metal compound is generally generated between these metal members, so a sufficient strength may not be obtained. According to the frictional joining method, however, this generation of the metal compound may be prevented, thereby providing a properly strong joining. The above-described Japanese Patent Laid-Open Publication discloses the frictional joining method, in which the metal member that the rotating tool contacts is heated in advance, thereby the metal member may be softened to prevent the rotating tool from being worn away.

Meanwhile, there generally exists an oxidation film on a surface of a metal member. This oxidation film would block a proper direct contact of respective new uncovered surfaces of the metal members in the frictional joining method. Thereby, the joining strength would deteriorate. Herein, the oxidation film generated on the surface of the metal member, against which the rotating tool is pressed, may be destroyed by the plastic flow of this metal member. However, the oxidation film that is generated on the surface of another metal member, against which the rotating tool is not pressed, may remain without destruction. The above-described US Patent Application Publication discloses the joining method, in which a metal plating is provided on the surface of the metal member in advance in order to block the generation of the oxidation film, and this metal plating is configured to be pushed out from a joining portion of the metal members by a pressing force of the rotating tool, or to be taken into the metal member pressed by the rotating tool, thereby providing the proper direct contact of respective new uncovered surfaces of the metal members.

In this frictional joining method disclosed in the US Patent Application Publication, it may be desirable that the metal plating is properly pushed out from the joining portion of the metal members by the pressing force of the rotating tool, so that the respective new uncovered surfaces of the metal members can contact each other in a properly wide range. However, there exists metal members that have their different physical properties, and therefore the degree of the metal plating pushed out defers depending on the kind of the metal members.

SUMMARY OF THE INVENTION

The present invention has been devised in view of the above-described matter, and an object of the present invention is to provide a properly-high joining strength in a frictional joining of a metal member with a metal plating thereon and another metal member.

According to the present invention, there is provided a joining method, in which a first metal member and a second metal member that lap over are provided, a metal plating being applied at least on a joining portion of the first metal member, a melting point of the second metal member being lower than that of the first metal member, and a rotating tool under rotation is pressed against the second metal member and the second metal member is softened and made in a plastic flow state by a frictional heat generated through a rotating and pressing operation of the rotating tool, whereby the first and second metal members are joined in a sold state, the joining method comprising a step of heating the metal plating applied on the joining portion of the first metal member before the rotating tool under rotation being pressed against the second metal member, wherein the rotating tool under rotation starts being pressed against the second metal member when the metal plating is heated by the heating step at least up to a specified temperature that is high enough to make the metal plating in a softened solid state.

According to the above-described joining method, the rotating tool under rotation starts being pressed against the second metal member when the metal plating is heated by the heating step at least up to the specified temperature that is high enough to make the metal plating in the softened solid state. Herein, it may be preferable that the above-described specified temperature be a solidus lines temperature of the metal plating. The metal plating that has been heated to its solidus lines temperature or higher may become in a softened solid state, preferably, in a liquid state or a mixed state of its liquid state and its solid state. In this state, the rotating tool is pressed against the second metal member. Accordingly, when the rotating tool is pressed against the second metal member, the metal plating on the surface of the first metal member has been properly softened, so the metal plating is more properly pushed out from the joining portion of the metal members by the pressing force of the rotating tool. As a result, the respective new uncovered surfaces of the metal members can contact each other in a properly wide range, and thereby the joining strength properly increases depending on the kind of the metal members.

According to an embodiment of the present invention, the rotating tool's starting of being pressed against the second metal member is conducted when the metal plating is heated up within a temperature range from the solidus lines temperature to the melting point of the second metal member. Thereby, the second metal member can be properly made in the plastic flow state without the second metal member being melt, having the above-described metal plating be more properly pushed out.

According to another embodiment of the present invention, the heating step is conducted by a heating resource that is provided at a receiving member that is disposed on an opposite side to the rotating tool so as to contact the first metal member to be jointed. Thereby, heating by the heating resource may not baldy influence the second metal member having the relatively low melting point.

According to another embodiment of the present invention, the first metal member is a steel plate with a plating having oxidation-prevention function as the metal plating, and the second metal member is an aluminum-alloy plate. The present invention is preferably applicable to the joining of the steel plate and the aluminum-alloy plate, particularly to the steel plate to which the plating having oxidation-prevention function is applied.

According to another embodiment of the present invention, the first and second metal members are spot-joined in the solid state. Thereby, the spot joining of the metal members that has a properly high strength can be provided.

Further, according to the present invention, there is provided a joining apparatus, in which a first metal member and a second metal member that lap over are provided, a metal plating being applied at least on a joining portion of the first metal member, a melting point of the second metal member being lower than that of the first metal member, and a rotating tool under rotation is pressed against the second metal member and the second metal member is softened and made in a plastic flow state by a frictional heat generated through a rotating and pressing operation of the rotating tool, whereby the first and second metal members are joined in a sold state, the joining apparatus comprising a drive device to drive the rotating tool, a receiving tool that is disposed on an opposite side to the rotating tool so as to contact the first metal member to be jointed, and a heating device to heat the metal plating applied on the joining portion of the first metal member, wherein the drive device is configured to start pressing the rotating tool under rotation against the second metal member when the metal plating is heated by the heating device at least up to a specified temperature that is high enough to make the metal plating in a softened solid state.

The above-described joining apparatus can also provide substantially the same functions and effects as those by the above-described joining method.

According to another embodiment of the present invention, the joining apparatus further comprises a temperature sensor to detect a heated temperature of the metal plating, wherein the drive device is configured to start pressing the rotating tool under rotation against the second metal member based on a detected temperature by the temperature sensor when the detected temperature increases at least up to the specified high temperature enough to make the metal plating in the softened solid state. Thereby, the start timing of pressing the rotating tool under rotation against the second metal member can be properly determined with the temperature sensor detecting the time the detected temperature increases at least up to the specified high temperature.

Other features, aspects, and advantages of the present invention will become apparent from the following description which refers to accompanying drawings.

DETAILED DESCRIPTION OF THE INVENTION

Hereinafter, preferred embodiments will be described referring to the accompanying drawings. It should be understood that even though embodiments are separately described, single features thereof may be combined to additional embodiments.

Figure 1:
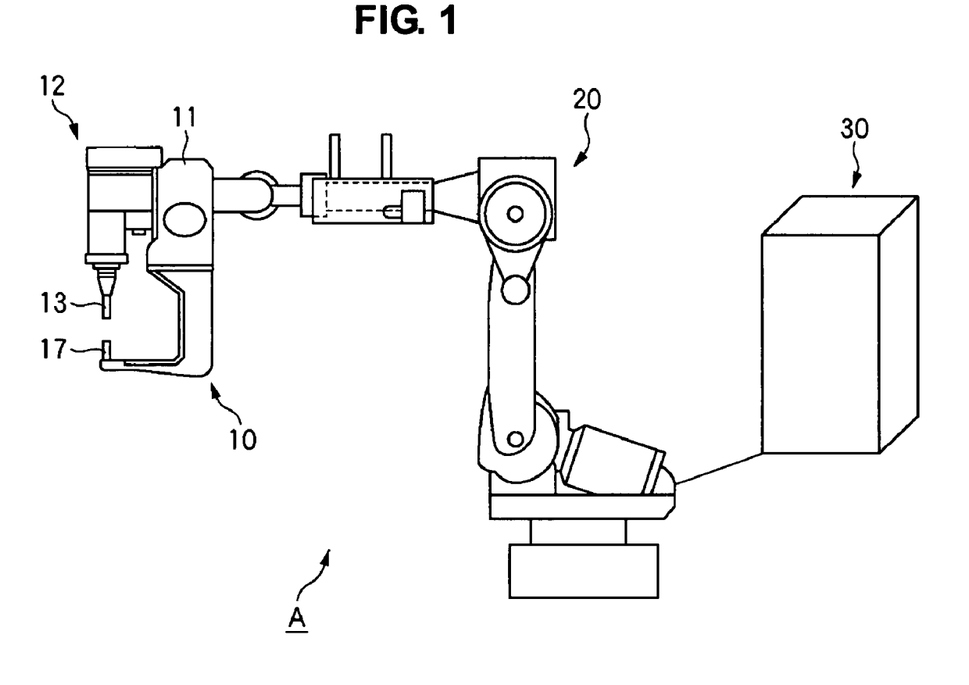
FIG. 1 is a schematic structure diagram of a joining apparatus A of an embodiment of the present invention.

FIG. 1 is a schematic structure diagram of a joining apparatus A of an embodiment of the present invention. The joining apparatus A is a joining apparatus that conducts a spot joining at plural points of metal members that form an automotive-vehicle body, for example. The joining apparatus A comprises a joining unit 10, robot 20 and control box 30. The robot 20 is a general six-axis multiple-articulated type of robot in which the joining unit 10 is movable three-dimensionally with its position adjustment with respect to joining points. The control box 30 is operationally coupled to a host computer, not illustrated, and controls the joining unit 10 and robot 20 based on instructions from the host computer.

Figure 2A:
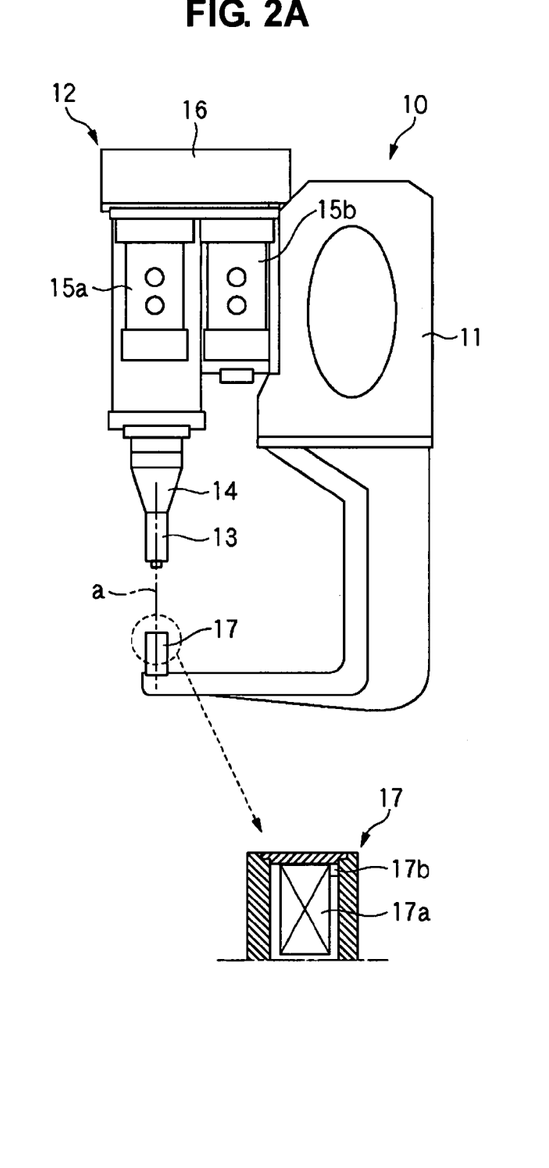
FIG. 2A is a plan view of a joining unit 10 with an enlarged view of part of the unit.
Figure 2B:
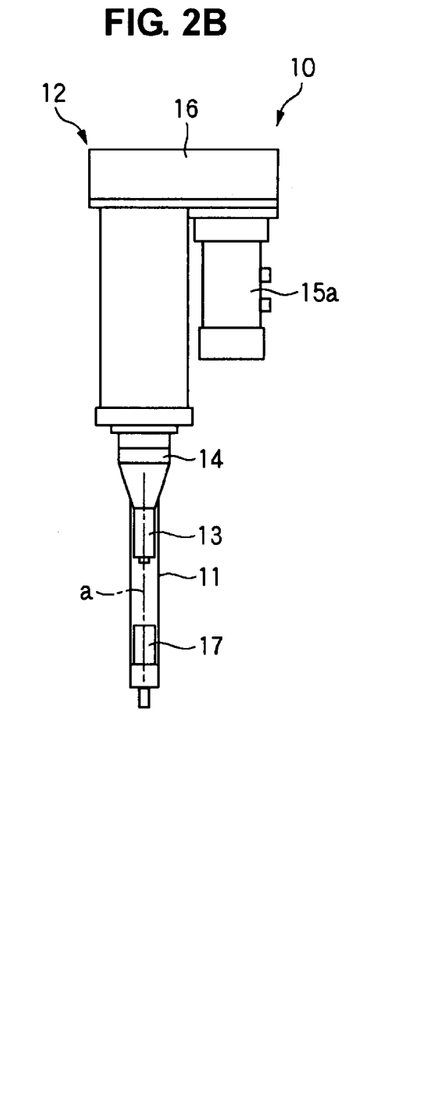
FIG. 2B is a left side view of the joining unit 10.

Next, the joining unit 10 will be described. FIG. 2A is a plan view of the joining unit 10 with an enlarged view of part of the unit, and FIG. 2B is a left side view of the joining unit 10. The joining unit 10 comprises a frame portion 11 that is connected to the robot 20 and a drive unit 12 that is supported at the frame portion 11.

The drive unit 12 comprises a rotating tool 13, a chuck portion 14 to support the rotating tool 13, a motor 15$a$ to rotate the rotating tool 13 along with the chuck portion 14, a motor 15$b$ to move up or down the rotating tool 13 along with the chuck portion 14, and a drive-mechanism storing portion 16 to store a drive mechanism therein. A known drive mechanism, such as a belt transmission mechanism, is stored in the drive-mechanism storing portion 16, and thereby the rotating tool 13 is rotated around its axial line a by transmitting a rotational force of the motor 15$a$ to the chuck portion 14. Further, another known drive mechanism, such as a ball-screw mechanism, is stored in the drive-mechanism storing portion 16, and thereby the rotational force of the motor 15$b$ is transmitted to the chuck portion 14 by transferring to a vertical-movement force, so the rotating tool 13 is moved up or down along the axial line a. These drive mechanisms and motors 15$a$, 15$b$ function as a drive device to drive the rotating tool 13.

The rotating tool 13 is of a cylindrical shape, which is coaxial to the axial line a, and has a projection (pin portion 13$b$) at a shoulder portion 13$a$ of its tip. Various types of tool may be applicable to the rotating tool 13, but it is preferable that the shoulder portion 13$a$ have a concavity, which is formed around the pin portion 13$b$ and becomes deeper toward the axial line a, at its tip. A receiving member 17 is provided at the frame portion 11 on an opposite side, facing the rotating tool 13. The receiving member 17 is of a cylindrical shape, which is coaxial to the axial line a, in the present embodiment, but any other different shape is applicable. Further, a heat resource 17$a$ and a temperature sensor 17$b$ are provided inside the receiving member 17. An electromagnetic-wave heating device, particularly a high-frequency induction heating device, may be used as the heat resource 17$a$. But, any other types are also applicable. The temperature sensor 17$b$ is a thermocouple, for example. Any sensor that can detect the temperature is applicable.

Next, a principle of the spot joining of different kinds of metal members with the joining unit 10 will be described referring to FIGS. 3A-3D. In the present embodiment, a first metal member having a metal plating applied at least on a joining portion thereof and a second metal member having a melting point thereof that is lower than that of the first metal member lap over to be joined.

The first metal member is a steel plate and the second metal member is a aluminum-alloy plate, for example. Herein, on the surface of the steel plate is generally provided a metal plating having oxidation-prevention function, such as a galvaneal plating (Fe—Zn binary-alloy plating or the like) that is made by applying alloying processing to a hot dip galvanizing, or an electrogalvanizing. This provided metal plating may properly prevent an oxidation film from being formed on the surface of the steel plate in the frictional joining as described above. However, if this metal plating remained at the joining face, the joining strength would deteriorate. In order that the metal plating may be properly pushed out from the joining face, it is preferable that the metal plating have been softened or melt. Herein, if the frictional heat generated during the frictional joining was improperly low, the metal plating would not be softened or melt sufficiently, so the metal plating could not be properly pushed out from the joining face. Herein, the present embodiment is configured such that the metal plating is properly heated in advance.

Figure 3A:
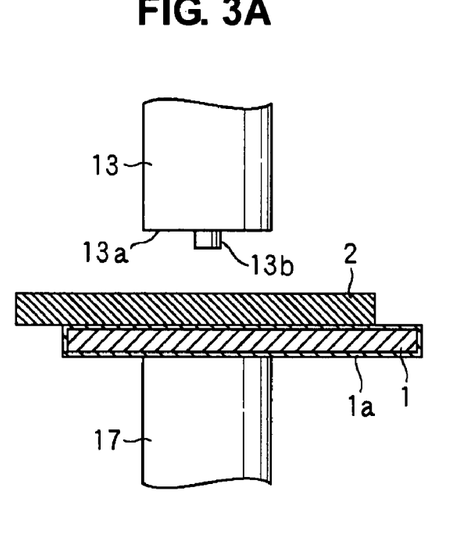
FIGS. 3A to 3D are operation-explanatory diagrams of the joining unit 10.

FIG. 3A shows a state where the joining unit 10 is located at the joining portion. The metal plating 1a is formed on the surface of the first metal member 1, so the joining portion is covered with the metal plating 1a. The both metal members 1 and 2 lap over and are provided between the rotating tool 13 and the receiving member 17. Herein, the receiving member 17 is provided so as to contact the first metal member 1.

Figure 3B:
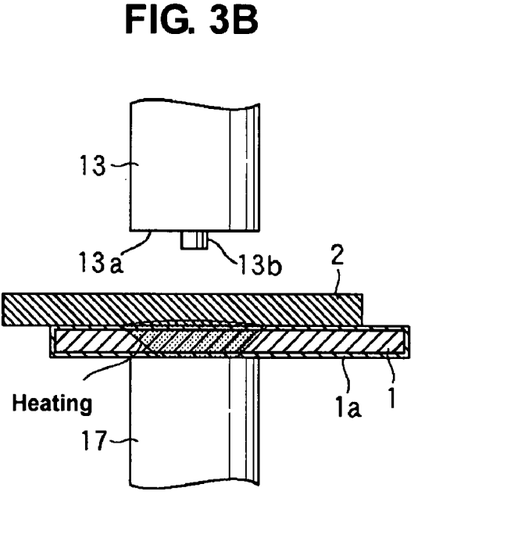

Then, the heat resource 17a is operated to heat the metal plating 1a as shown in FIG. 3B. Herein, the heat generated by the heat resource 17a is transmitted via the receiving member 17 and the first metal member 1, and heats the metal plating 1a that is located at a boundary of the first and second metal members 1 and 2. Although it is provided so as to be away from the second metal member 2 that is shown in this figure, the rotating tool 13 may be provided to contact the second metal member in such a manner that the both metal members 1 and 2 are held by the rotating tool 13 and the receiving member 17. However, the rotating tool 13 is not yet pressed against the second metal member 2 at this stage.

Figure 3C:
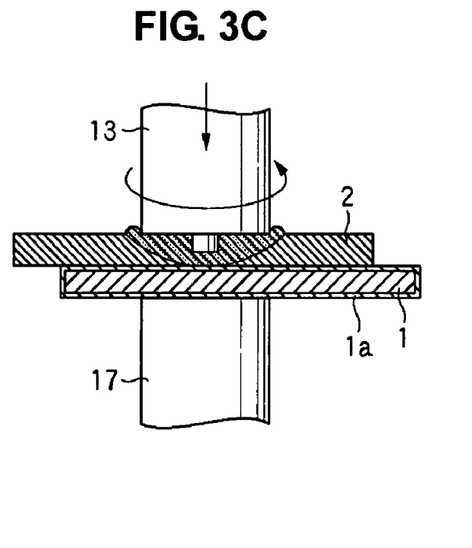
Figure 4:
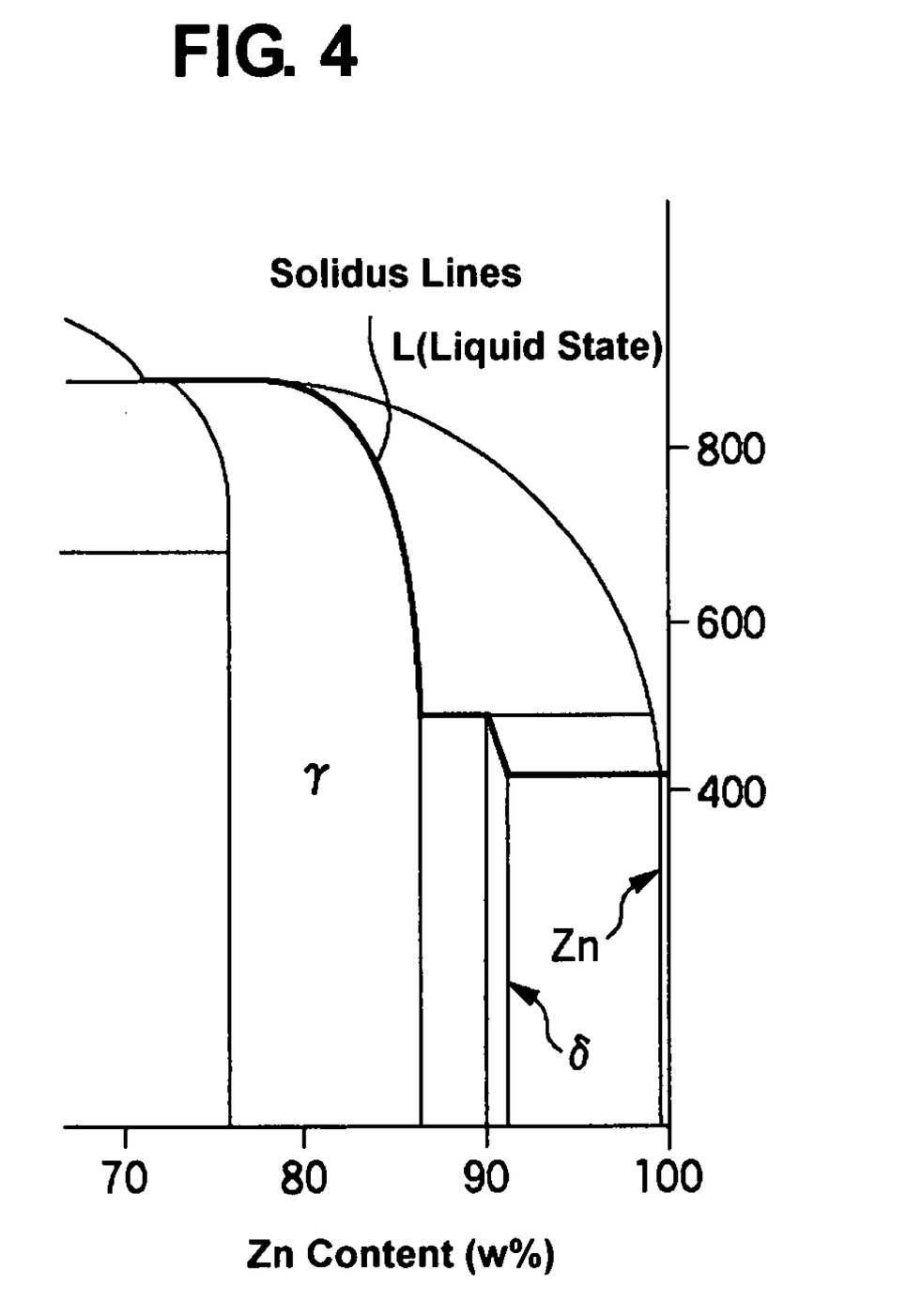
FIG. 4 is a Ni—Zn binary-alloy state chart.

Next, the rotating tool 13 under rotation is pressed against the second metal member 2 as shown in FIG. 3C. Herein, the timing of pressing the rotating tool 13 is at least when the temperature of the metal plating 1a increases to a solidus lines temperature of the metal plating 1a or higher. The solidus lines temperature depends on composition of the metal plating. FIG. 4 is a Ni—Zn binary-alloy state chart, and a solid line in the figure shows its solidus lines. In a case where the electrogalvanizing (Zn-10 w % Ni) is applied to the metal plating 1a, for example, its solidus lines temperature may be approximately 490 degrees centigrade from apparent from FIG. 4.

In the present embodiment, there is provided the temperature sensor 17b to detect the temperature of the metal plating 1a as described above. The temperature sensor 17b is located near the surface (a contact face with the first metal member 1) of the receiving member 17 to detect the metal plating 1a indirectly via the first metal member 1 and the receiving member 17. Accordingly, it may be preferable to ensure the pressing that the above-described pressing timing of the rotating tool 13 is set to be when the detected temperature by the temperature sensor 17b has reached a certain temperature that is little higher than the solidus lines temperature. Meanwhile, the heat from the heat resource 17a is also transmitted to the second metal member. 2, and if the temperature of the second metal member 2 increased to its melting point, no plastic flow would occur.

Therefore, it may be preferable that the pressing timing of the rotating tool 13 is set to be when the temperature of the metal plating 1a that is predicted by the detection of the temperature sensor 17b is heated up within a temperature range from the solidus lines temperature to the melting point of the second metal member 2. For example, in the case where the second metal member 2 is the aluminum alloy plate and the metal plating 1a is the electrogalvanizing (Zn-10 w % Ni), it may be preferable that the pressing timing of the rotating tool 13 is set to be when the temperature of the metal plating 1a is a specified temperature that is higher than approximately 490 degrees centigrade (solidus lines temperature) and lower than approximately 660 degrees centigrade (melting point of aluminum alloy), preferably the solidus lines temperature of the aluminum alloy or lower. When considering the detection of the temperature sensor 17b, it may be also preferable that the rotating tool 13 be pressed when the detected temperature by the temperature sensor 17b increases within a range of 500 to 600 degrees centigrade.

Figure 3D:
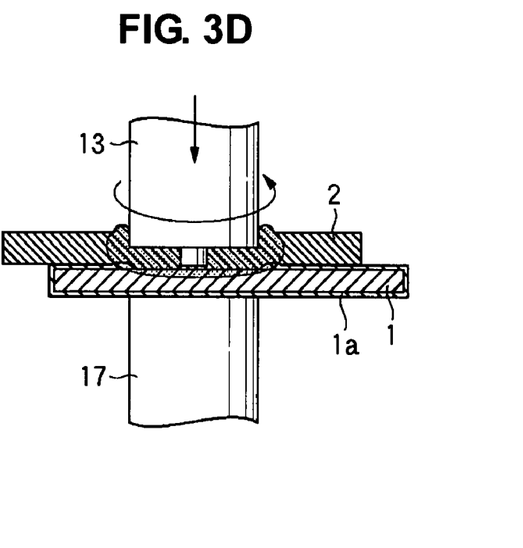

Returning to FIG. 3C, as the rotating tool 13 under rotation is pressed against the second metal member 2, the second metal member 2 is softened and made in the plastic flow state by the frictional heat. A transmitting range of the frictional heat expands as the rotating tool 13 is pressed further, and as shown in FIG. 3D, the plastic flow state prevails around the boundary between the first and second metal members 1 and 2.

Herein, the metal plating 1a that has been heated exceeding the solidus lines temperature becomes a liquid state or a mixed state of its liquid state and its solid state, namely, the metal plating 1a has been softened or melt. Thereby, the softened metal plating 1a can be properly pushed out from the joining boundary portion by the plastic flow of the second metal member 2. Also, the oxidation film that has been formed at the surface of the second metal member 2 can be destroyed by the plastic flow of the second metal member 2. Accordingly, new uncovered surfaces of the first and second metal members 1 and 2 are exposed and contact each other at the joining boundary face of the metal members 1 and 2. As a result, the both members can be properly joined in the solid state with the pressing force of the rotating tool 13.

The heating by the heat resource 17 basically continues while the rotating tool 13 is pressed. But, in a case where the pressing of the rotating tool 13 is complete for a short period of time, and the temperature of the metal plating 1a maintains its high state over the solidus lines temperature without continuous heating, the heating by the heat resource 17 may be stopped before the joining is complete.

Figure 5:
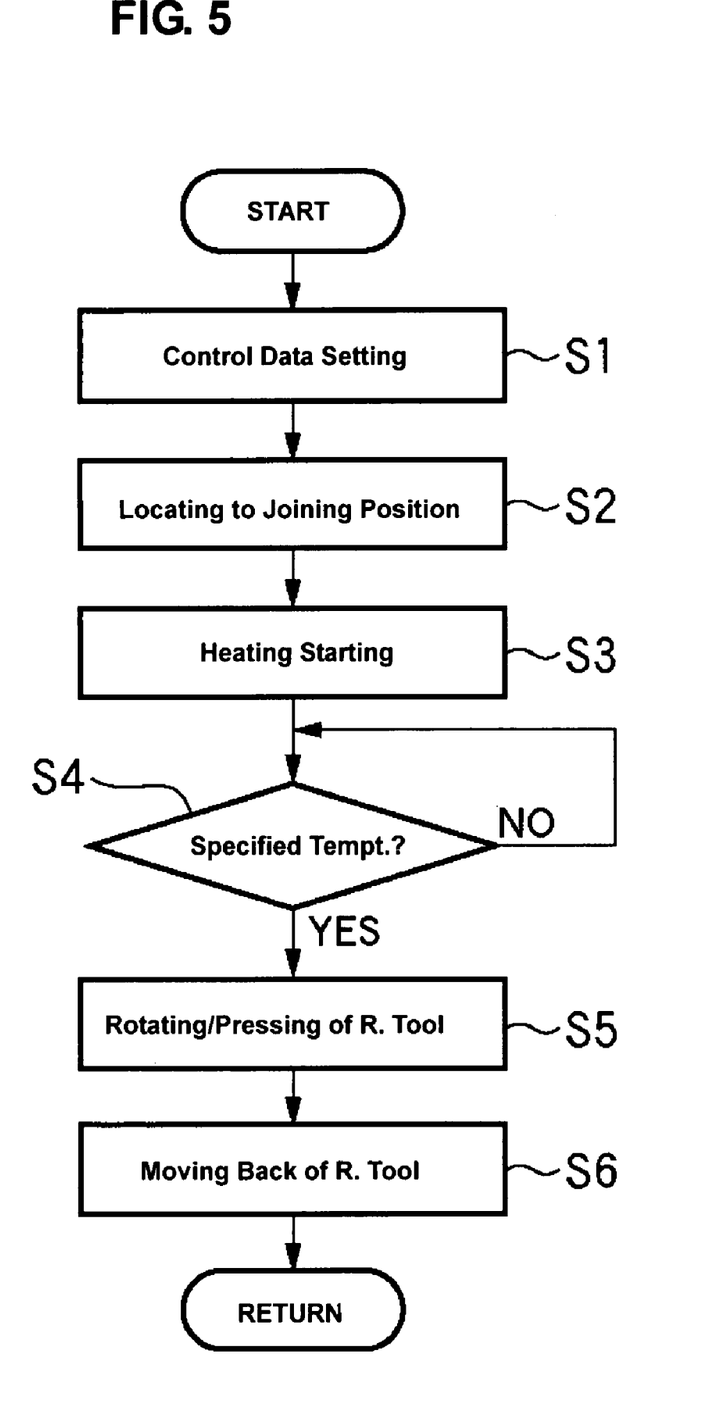
FIG. 5 is a flowchart showing processing executed by a control box 30.

Next, an exemplified control of the joining unit 10 and robot 20 by the control box will be described. FIG. 5 is a flowchart showing processing executed by the control box 30 for a single spot joining. In step S1, control data setting is conducted. Specifically, according to instructions from the host computer, not illustrated, various setting of three-dimension coordinates data for joining position, drive conditions of the rotating tool 13 (rotational speed, pressing amount, pressing time, etc.), the heating temperature of the metal plating 1a and so on are conducted.

In step S2, the robot 20 is controlled to locate the joining unit 10 at the joining position set in the step S1. Then, the heating of the metal plating 1a is started by operating the heat resource 17a in step S3. In step S4, it is determined based on the detection of the temperature sensor 17a whether the detected temperature exceeds the heating temperature set in the step S1 or not. Herein, this heating temperature is set to be higher than the solidus lines temperature of the metal plating 1a as described above. When the determination is YES, a control sequence proceeds to step S5. When it is NO, the control sequence returns. The present embodiment uses the detection of the temperature sensor 17a, but the determination as to whether or not the detected temperature exceeds the heating temperature may be made based on the heating period of time. Namely, the temperature of the metal plating 1a heated may be predicted by using the heating period of time.

Rotating and pressing of the rotating tool 13 against the second metal member 2 is started in step S5. After the drive control is complete as set in the step S1, in step S6 the rotating tool 13 is moved away from the second metal member 2, and the operation of the heat resource 17a is stopped. Thus, the processing for the single spot joining ends. Then, the same processing is conducted for the next spot joining portion. Herein, if the drive conditions are the same through this continuous spot joining, the heat resource 17b may be operated continually.

Figure 6:
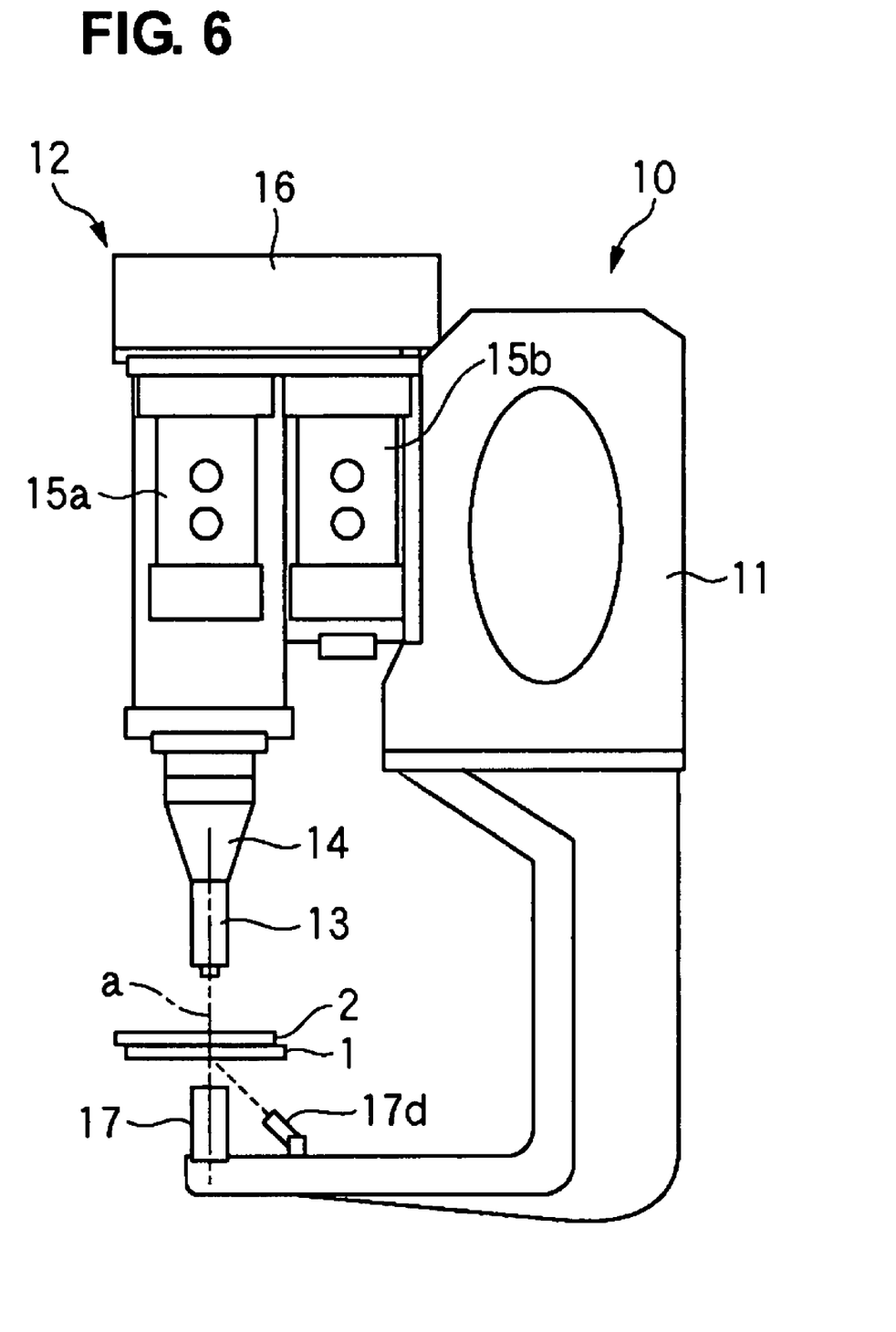
FIG. 6 is a diagram showing another example of the joining unit 10.

Other heating devises for the metal plating 1a than the above-described heat resource 17a provided at the receiving member 17 is applicable. As shown in FIG. 6, for example, a laser irradiation device 17d instead of the heat resource 17a is provided, and the heating may be done by a laser irradiation. The metal plating 1a at the boundary between the first and second metal members 1 and 2 is generally heated indirectly via the first metal member 1 or the second metal member 2. Herein, it is preferable that the heating be conducted from a side of the first metal member 1 having the lower meting point, like the examples shown in FIGS. 2 and 6. This may properly avoid an erroneous over heating of the second metal member 2 up to its meting point.

Although the Ni—Zn binary-alloy plating is used as the metal plating 1a in the above-described embodiment, the Zn—Fe 10 w % binary-alloy plating as the galvaneal plating may be used. The solidus lines temperature of this plating is approximately 530 degrees centigrade, so the metal plating 1a may be heated more than this solidus lines temperature in this case.

Any other modifications and improvements may be applied within the scope of a sprit of the present invention.

What is claimed is:

1. A joining method, in which a first metal member and a second metal member that lap over are provided, a metal plating being applied at least on a joining portion of the first metal member, a melting point of the second metal member being lower than that of the first metal member, and a rotating tool under rotation is pressed against the second metal member and the second metal member is softened into a plastic flow state by a frictional heat generated through a rotating and pressing operation of the rotating tool, whereby the first and second metal members are joined in a solid state, the joining method comprising:

a step of heating said metal plating applied on the joining portion of the first metal member before the rotating tool under rotation is pressed against the second metal member;

a step of detecting the temperature of the metal plating heated in said heating step;

a step of setting a pressing timing of the rotating tool under rotation against the second metal member when the temperature of the metal plating detected in said detecting step reaches a specified temperature that is high enough to set the metal plating in a softened solid state;

a step of starting pressing of the rotating tool under rotation against the second metal member at the pressing timing set in said setting step; and a step of pushing out the metal plating softened in said heating step from a joining boundary portion between the first and second metal members through the rotating and pressing operation of the rotating tool, whereby the first and second metal members are joined in the solid state substantially without said metal plating and with a direct contact of new uncovered surfaces of the metal members at the joining boundary portion of the metal members.

2. The joining method of claim 1, wherein said specified temperature is a solidus line temperature of the metal plating, and said tool is against the second metal member when the metal plating is heated up within a temperature range from the solidus line temperature to the melting point of the second metal member.

3. The joining method of claim 1, wherein said heating step is conducted by a heating source that is provided at a receiving member that is disposed on an opposite side to the rotating tool so as to contact the first metal member to be jointed.

4. The joining method of claim 2, wherein said heating step is conducted by a heating source that is provided at a receiving member that is disposed on an opposite side to the rotating tool so as to contact the first metal member to be jointed.

5. The joining method of claim 1, wherein said first metal member is a steel plate with a plating having oxidation-prevention function as said metal plating, and said second metal member is an aluminum-alloy plate.

6. The joining method of claim 2, wherein said first metal member is a steel plate with a plating having oxidation-prevention function as said metal plating, and said second metal member is an aluminum-alloy plate.

7. The joining method of claim 3, wherein said first metal member is a steel plate with a plating having oxidation-prevention function as said metal plating, and said second metal member is an aluminum-alloy plate.

8. The joining method of claim 4, wherein said first metal member is a steel plate with a plating having oxidation-prevention function as said metal plating, and said second metal member is an aluminum-alloy plate.

9. The joining method of claim 1, wherein said first and second metal members are spot-joined in the solid state.

* * * * *